(12) United States Patent
Wagner

(10) Patent No.: US 12,252,285 B2
(45) Date of Patent: Mar. 18, 2025

(54) SANDWICH PACKAGING SYSTEM

(71) Applicant: JLS Automation, York, PA (US)

(72) Inventor: Corey Wagner, Glen Rock, PA (US)

(73) Assignee: JLS Automation, York, PA (US)

(\*) Notice: Subject to any disclaimer, the term of this patent is extended or adjusted under 35 U.S.C. 154(b) by 177 days.

(21) Appl. No.: 18/187,282

(22) Filed: Mar. 21, 2023

(65) Prior Publication Data
US 2024/0317435 A1  Sep. 26, 2024

(51) Int. Cl.
*B65G 47/90* (2006.01)
*B65B 5/04* (2006.01)
*B65B 35/36* (2006.01)

(52) U.S. Cl.
CPC .............. *B65B 5/045* (2013.01); *B65B 35/36* (2013.01); *B65G 47/902* (2013.01); *B65G 47/907* (2013.01); *B65G 2201/0202* (2013.01)

(58) Field of Classification Search
CPC ..... B65G 47/902; B65G 47/90; B65G 47/907; B65B 35/36; B25J 11/0045; B25J 15/024
See application file for complete search history.

(56) References Cited

U.S. PATENT DOCUMENTS

| | | | |
|---|---|---|---|
| 10,583,996 B1* | 3/2020 | Pentzer | B65G 21/2072 |
| 11,452,297 B2* | 9/2022 | Hare | B65B 35/36 |
| 2020/0180164 A1* | 6/2020 | Boudreau | B25J 15/02 |
| 2021/0400993 A1* | 12/2021 | Hare | B65B 25/06 |
| 2022/0371208 A1* | 11/2022 | Gallagher | B25J 15/0475 |
| 2022/0371210 A1* | 11/2022 | Whitear | B25J 11/0045 |
| 2024/0262638 A1* | 8/2024 | Zmeu | B64F 5/50 |

\* cited by examiner

*Primary Examiner* — Andrew M Tecco
(74) *Attorney, Agent, or Firm* — Barley Snyder

(57) ABSTRACT

A sandwich packaging system comprising a handler tool assembly. The handler tool assembly having a support assembly. The handler tool assembly further has a receiving assembly. The receiving assembly has a receiving base. The handler tool assembly further has a claw assembly. The claw assembly has a plurality of handler claws. The handler tool assembly drops in a vertical direction and clamps a product by the plurality of handler claws.

18 Claims, 17 Drawing Sheets

SANDWICH PACKAGING SYSTEM

FIELD OF THE INVENTION

The present invention relates to a sandwich packaging system and, more particularly, to an automated packaging system for transporting sandwiches.

BACKGROUND

In general, food products, such as sandwiches, particularly wraps as the most prominent example, are often provided as logs, characterized by having the product placed in a container uncut and allowing the contents to fall out from the open sides of the wrap or cutting the wrap in half and allowing the contents to open from the middle.

Additionally, cutting the wraps into individual sections and placing the sections into the container to create a "pinwheel effect" is shown to add security to the contents of the wrap. However, manually positioning each pinwheel into the container is time consuming and also costly if the contents inside the pinwheel are released prior to securing the pinwheel into the container. Moreover, in a fast paced environment such as an assembly line, a costly dropping of contents of the pinwheel could slow or even stop production.

It is desirable to secure the contents of a sandwich while maintaining efficiency. As the foregoing illustrates, the invention provides the sandwich packaging system to allow for automated transport of sandwiches.

SUMMARY

A sandwich packaging system comprising a handler tool assembly. The handler tool assembly having a support assembly. The support assembly has a main body including a plurality of connection legs. The support assembly further has an inner frame coupler. The handler tool assembly further has a receiving assembly. The receiving assembly has a receiving base. The receiving assembly further has a formulated wall positioned below the receiving base including a plurality of article receivers. The handler tool assembly further has a claw assembly. The claw assembly has a plurality of handler claws. The claw assembly further has a directional assembly having a robotic arm assembly coupled to the support assembly by a robotic coupler. The handler tool assembly drops in a vertical direction and clamps a product by the plurality of handler claws.

BRIEF DESCRIPTION OF DRAWINGS

In the following, the present invention is described in more detail with references to the drawings in which.

DETAILED DESCRIPTION OF THE EMBODIMENTS

Figure 1:
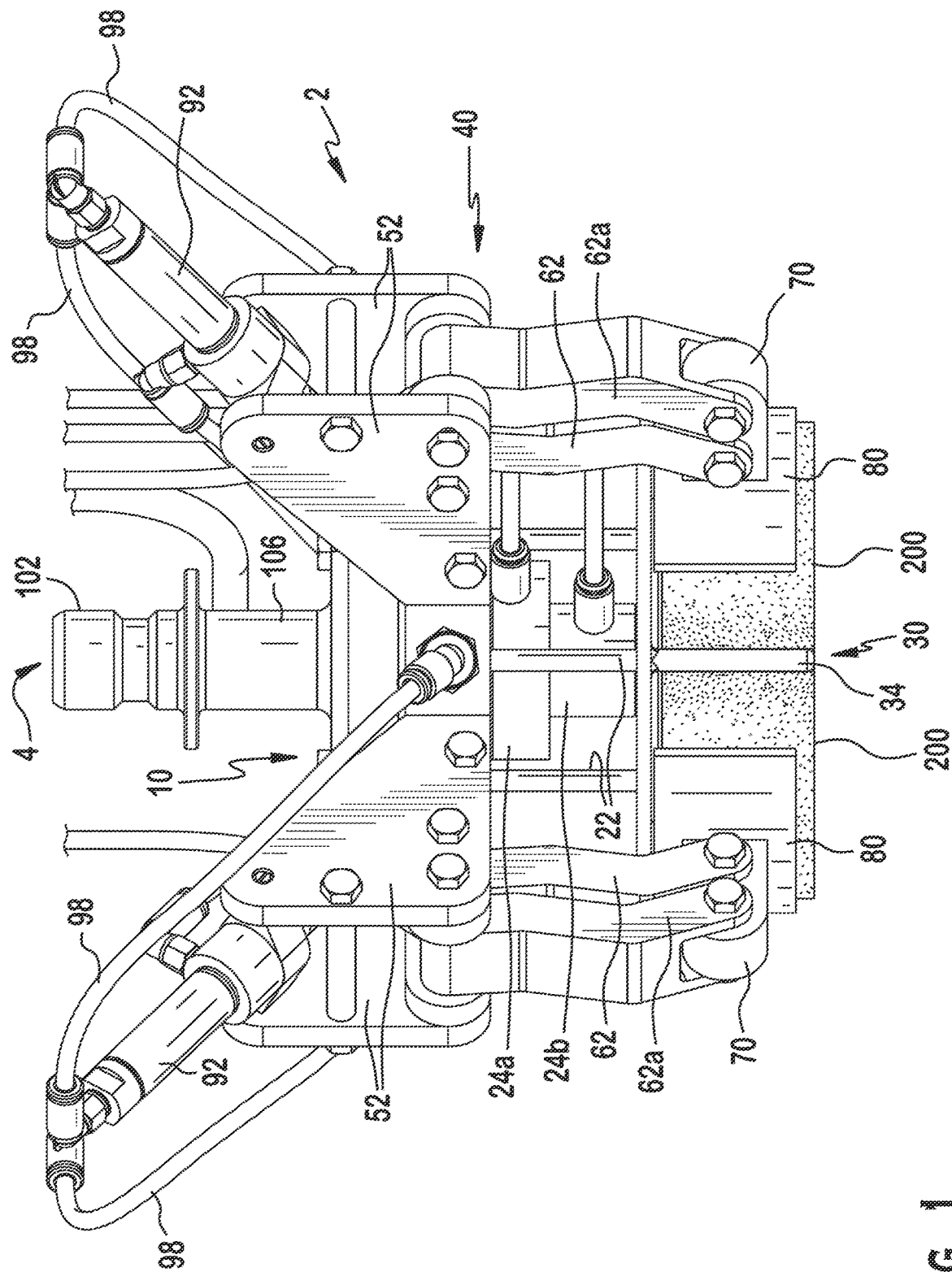
FIG. 1 is a front perspective view of a sandwich packaging system.

The present disclosure includes a sandwich packaging system 1 according to the invention. In the exemplary embodiment, the sandwich packaging system 1 generally has a handler tool assembly 2 and a directional assembly 4.

In the exemplary embodiment, the handler tool assembly 2 generally has a support assembly 10, a receiving assembly 30, and a claw assembly 40.

Figure 2:
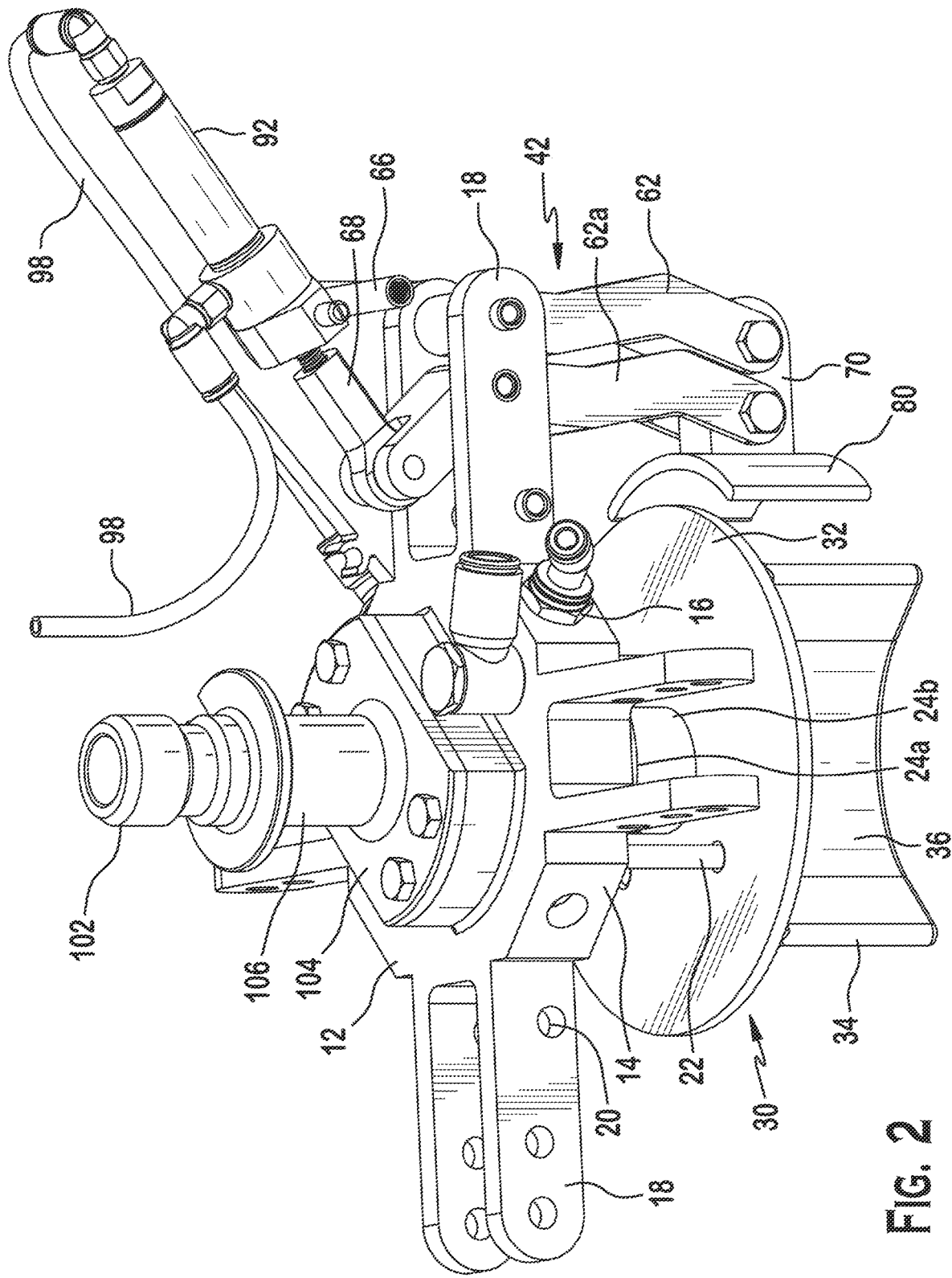
FIG. 2 is a sectional view of the invention of FIG. 1.

As illustrated in FIGS. 1-2, the support assembly 10 includes a main body 12. The main body 12 is an orthogonal member. The main body 12 further includes a plurality of connectors 14 that are positioned on a bottom of the main body 12. The main body 12 further includes a plurality of actuator receivers 16 positioned on a plurality of side walls of the main body 12.

As illustrated in FIG. 2, the main body 12 further includes a plurality of connection legs 18. As shown in FIGS. 1-2, the plurality of connection legs 18 extend outwards from the plurality of side walls of the main body 12. Each connection leg 18 is an elongated member. Each connection leg 18 further includes a plurality of fastener passageways 20.

As illustrated in FIG. 2, the main body 12 further includes a plurality of supports 22. The plurality of supports 22 are rod like members.

As illustrated in FIG. 2, the main body 12 further includes a pair of inner frame couplers 24. Each inner frame coupler 24 is a cylindrical member. A first inner frame coupler 24a is positioned adjacent the main body 12. A second inner frame coupler 24b is positioned adjacent the receiving base 32. One skilled in the art would understand the applicant's design is not the exclusive embodiment.

As illustrated in FIGS. 1-2, the receiving assembly 30 includes a receiving base 32. The receiving base 32 is a circular member. The receiving base 32 further includes a formulated wall 34 positioned below the receiving base 32 as shown in FIG. 2. The formulated wall 34 is an X-shaped member. The formulated wall 34 further includes a plurality of article receivers 36. Each of the article receivers 36 is positioned on an inner side wall of the formulated wall 34 as illustrated in FIG. 2. The receiving assembly 30 further includes a connector 38 positioned within the receiving base 32.

Figure 3:
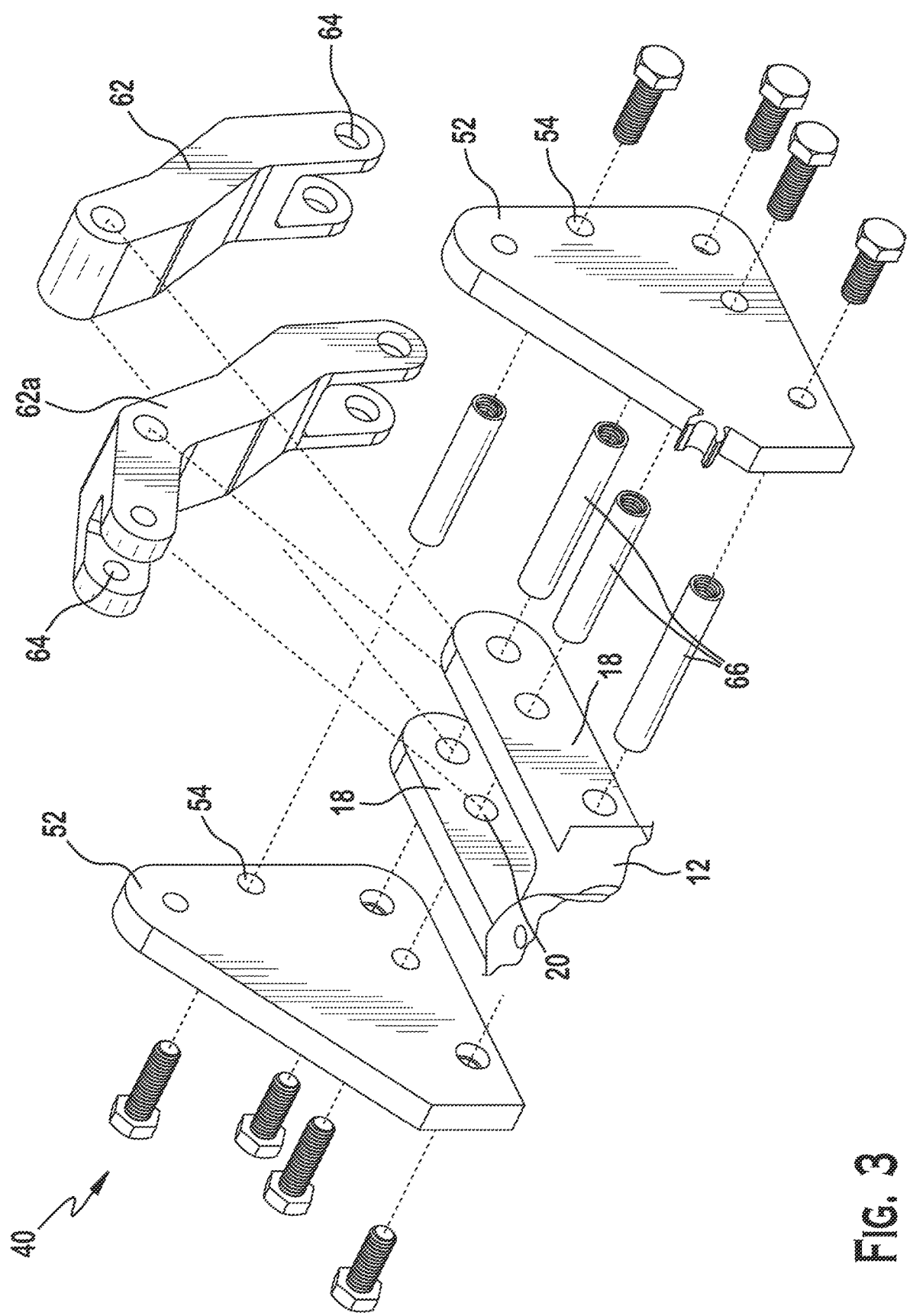
FIG. 3 is another sectional view of the invention of FIG. 2.
Figure 4:
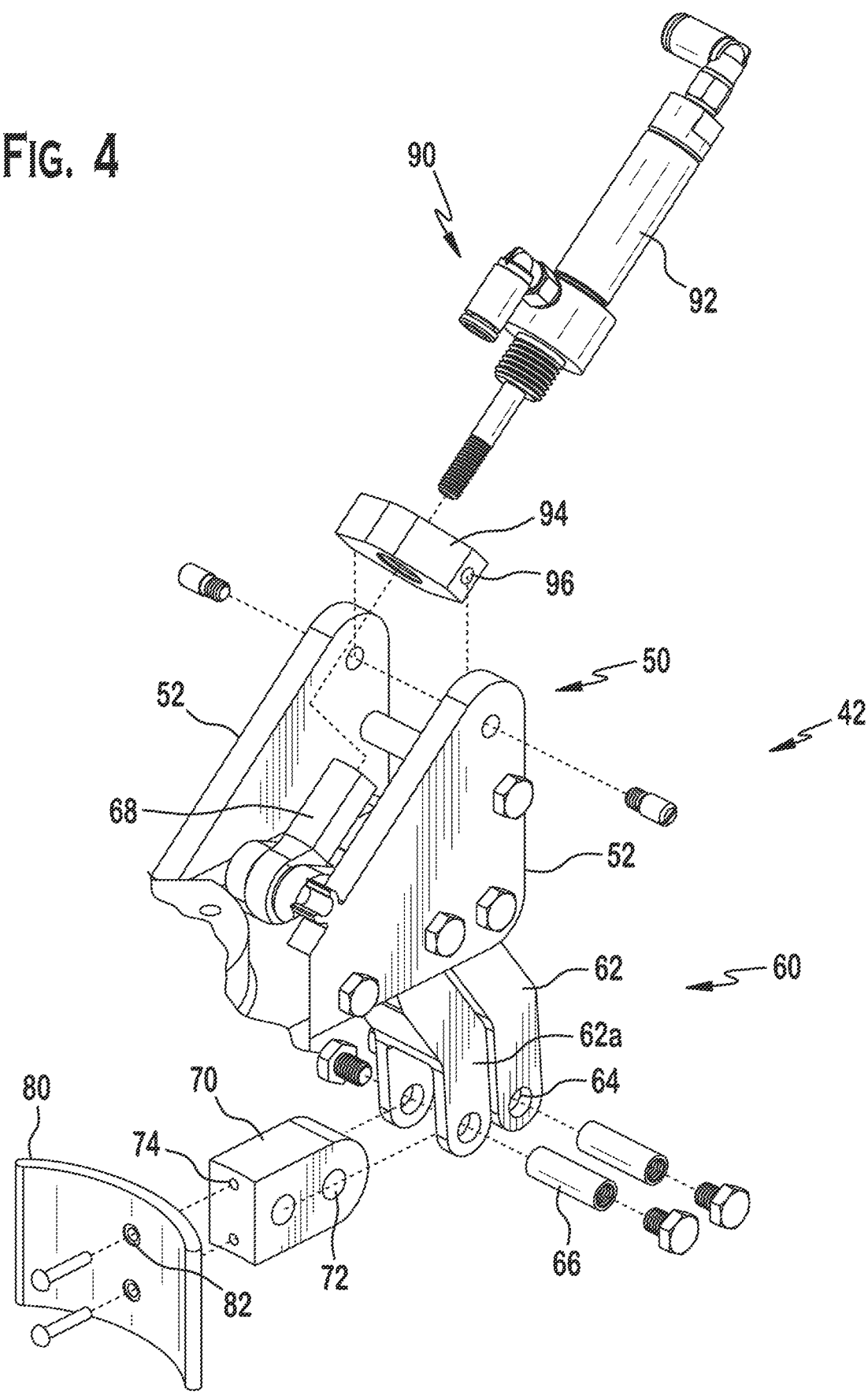
FIG. 4 is another sectional view of the invention of FIG. 3.
Figure 5:
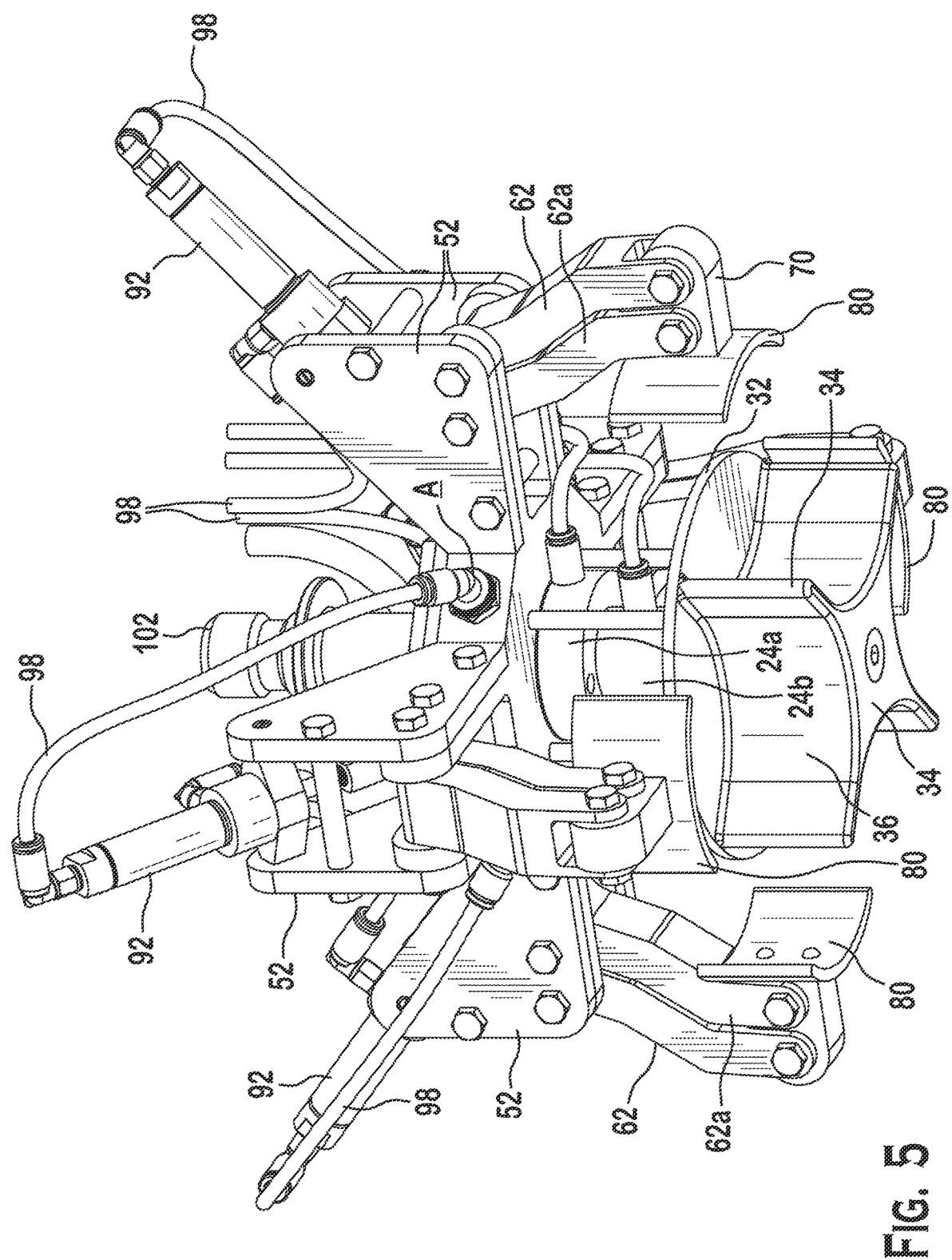
FIG. 5 is a front, bottom, left side perspective view of the sandwich packaging system according to the invention.

As illustrated in FIGS. 3-4, the claw assembly 40 is composed of a plurality of handler claws 42. Each handler claw 42 generally includes a claw frame assembly 50, a claw arm assembly 60, a cradle 80, and a claw actuator assembly 90.

As illustrated in FIG. 3, the claw frame assembly 50 is a pair of plate like members 52. The claw frame assembly 50 further includes a plurality of fastener passageways 54 positioned on each plate like member 52.

As illustrated in FIG. 4, the claw arm assembly 60 is a pair of movement members 62. Each of the movement members 62 are elongated couplers. Each movement member 62 further includes a plurality of fastener passageways 64. Each movement member 62 further includes a plurality of joint connectors 66 as illustrated in FIG. 4. A first movement member 62a further includes an actuator connector 68 positioned at an end closer to the main body 12. The actuator connector 68 is a securing member for receiving the claw actuator assembly 90.

The claw arm assembly 60 further includes a cradle coupler 70. The cradle coupler 70 is a semi-circular member. One skilled in the art would understand the applicant's design is not the exclusive embodiment. The cradle coupler 70 further includes a plurality of connector openings 72. The cradle coupler 70 further includes a plurality of cradle receivers 74.

As illustrated in FIG. 4, the cradle 80 is a crescent shaped member. The cradle 80 further includes a pair of mounting passageways 82 as illustrated in FIG. 4.

As illustrated in FIG. 4, the claw actuator assembly 90 includes an actuator 92. The actuator 92 is designed in any suitable form for reversibly extending and retracting components, including electric linear actuators, hydraulic cylinders, or pneumatic cylinders. In the depicted embodiment, there are shown linear actuators 92 in the form of pneumatic cylinders that are driven by gas pressure, such as vacuum or compressed gas, such as air pressure. As depicted, the pneumatic cylinder has a barrel portion and piston rod portion, and as depicted is positioned above the claw assembly 40.

The claw actuator assembly 90 further includes the actuator coupler 94. The actuator coupler 94 is rhombus shaped donut as illustrated in FIG. 4. One skilled in the art would understand the applicant's design is not the exclusive embodiment. The actuator coupler 94 further includes a pair of positioning connectors 96 as illustrated in FIG. 4.

The claw actuator assembly 90 further includes a plurality of actuator lines 98. One skilled in the art would understand the applicant's design is not the exclusive embodiment. The claw actuator assembly 90 further includes a plurality of central actuators A positioned in the plurality of actuator receivers 16 of the main body 12.

Figure 6:
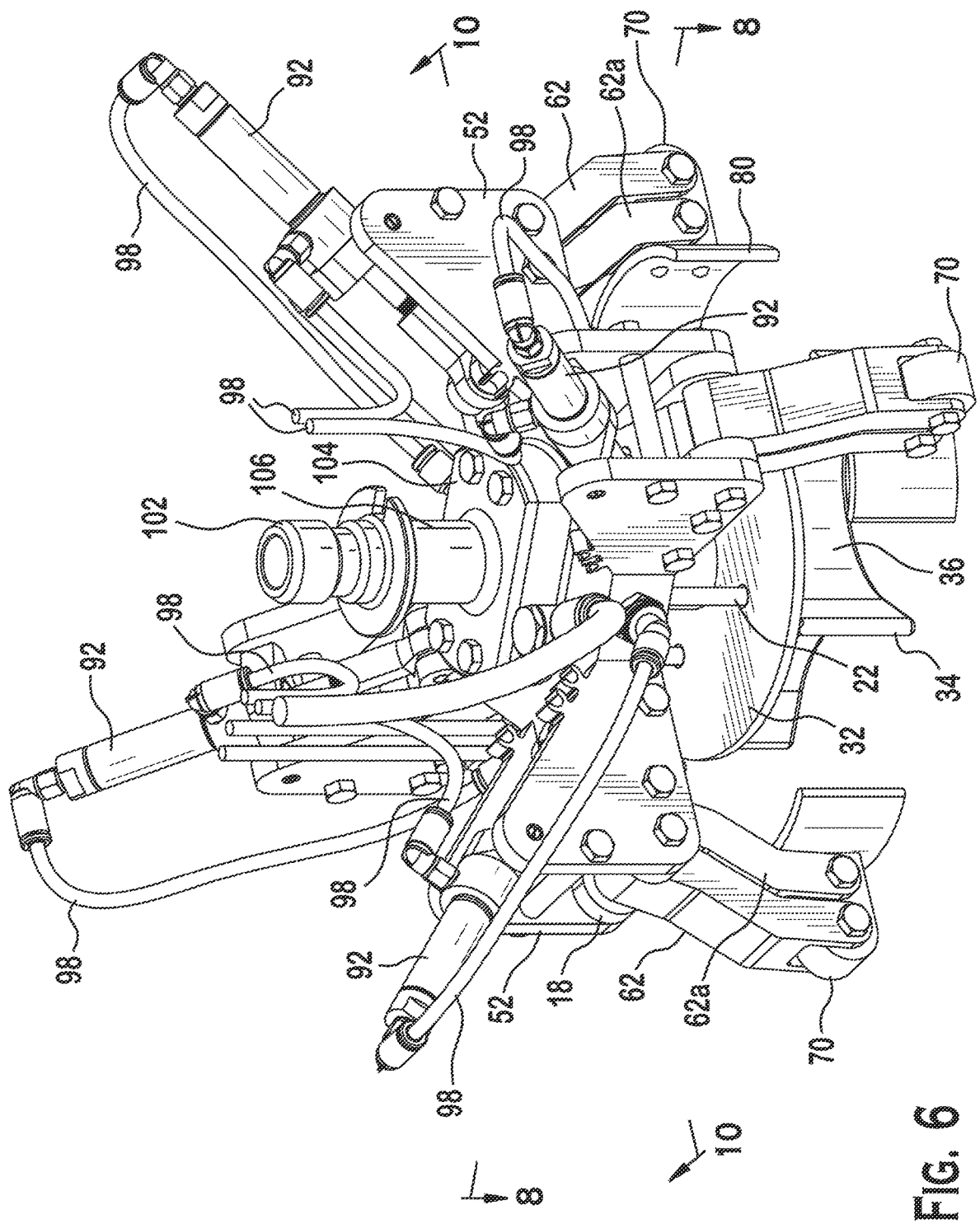
FIG. 6 is a front, top, left side perspective view of the sandwich packaging system according to the invention.
Figure 7:
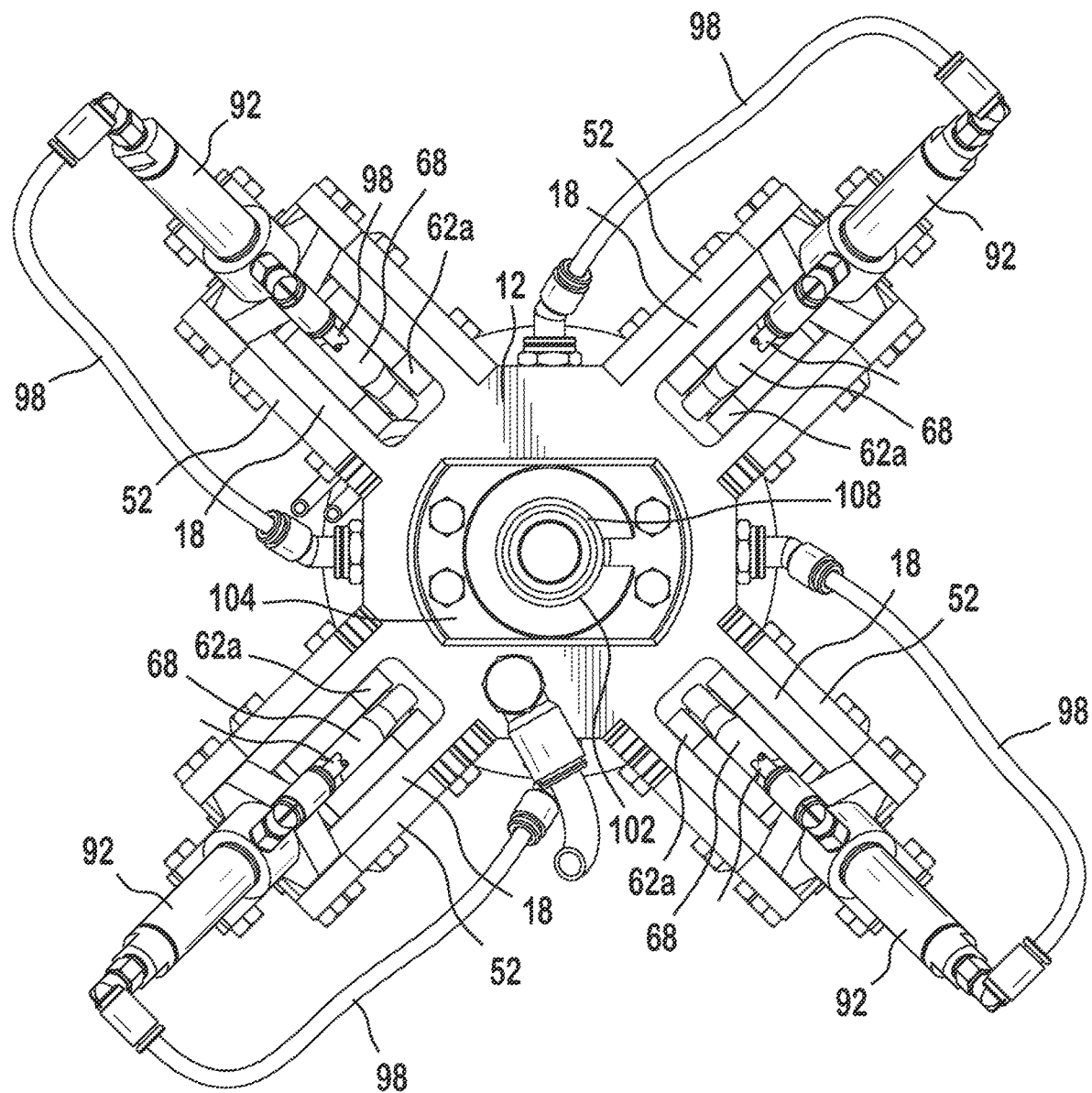
FIG. 7 is a top perspective view of FIG. 6.
Figure 8:
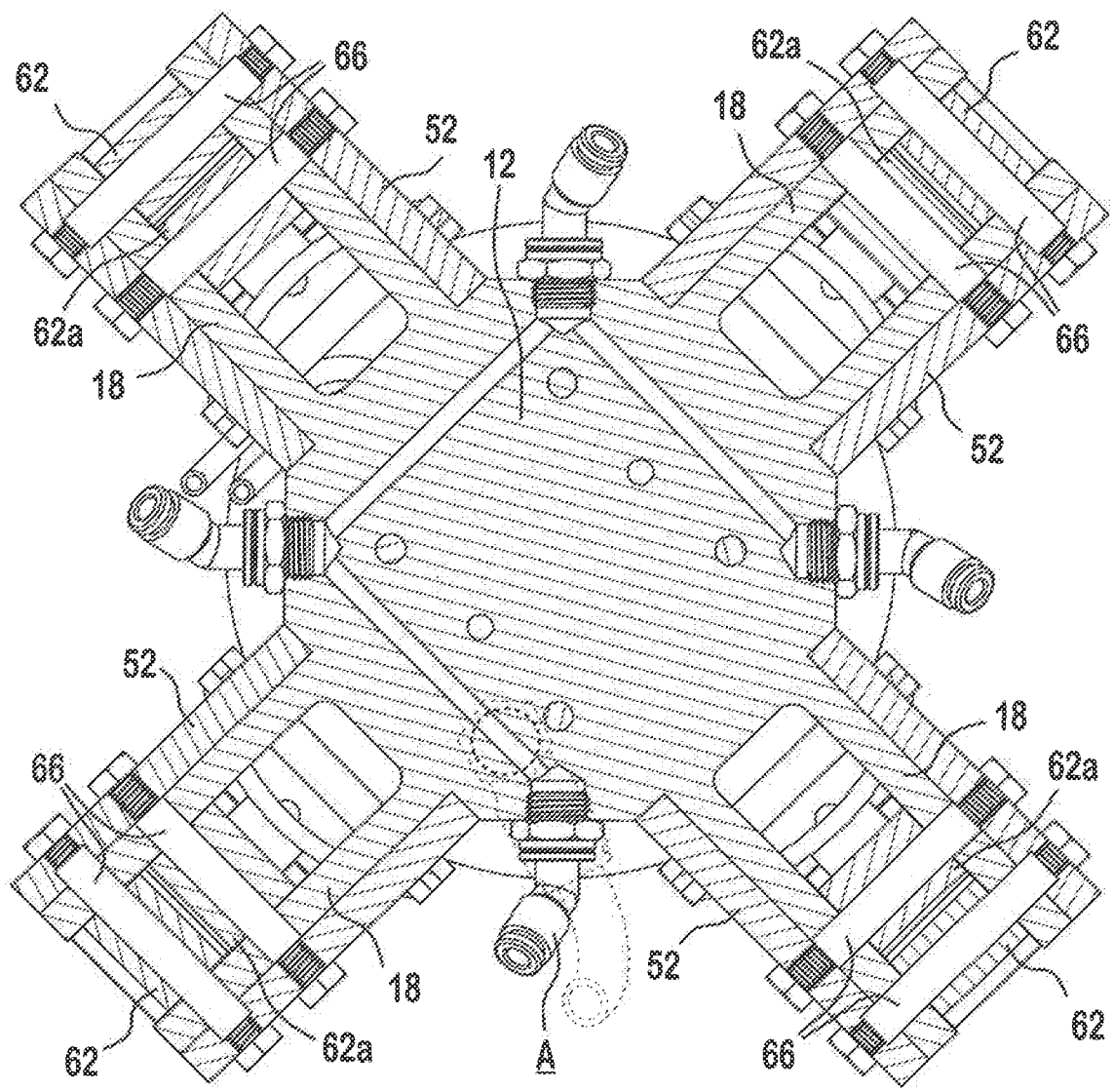
FIG. 8 is a cross sectional view of FIG. 7.
Figure 9:
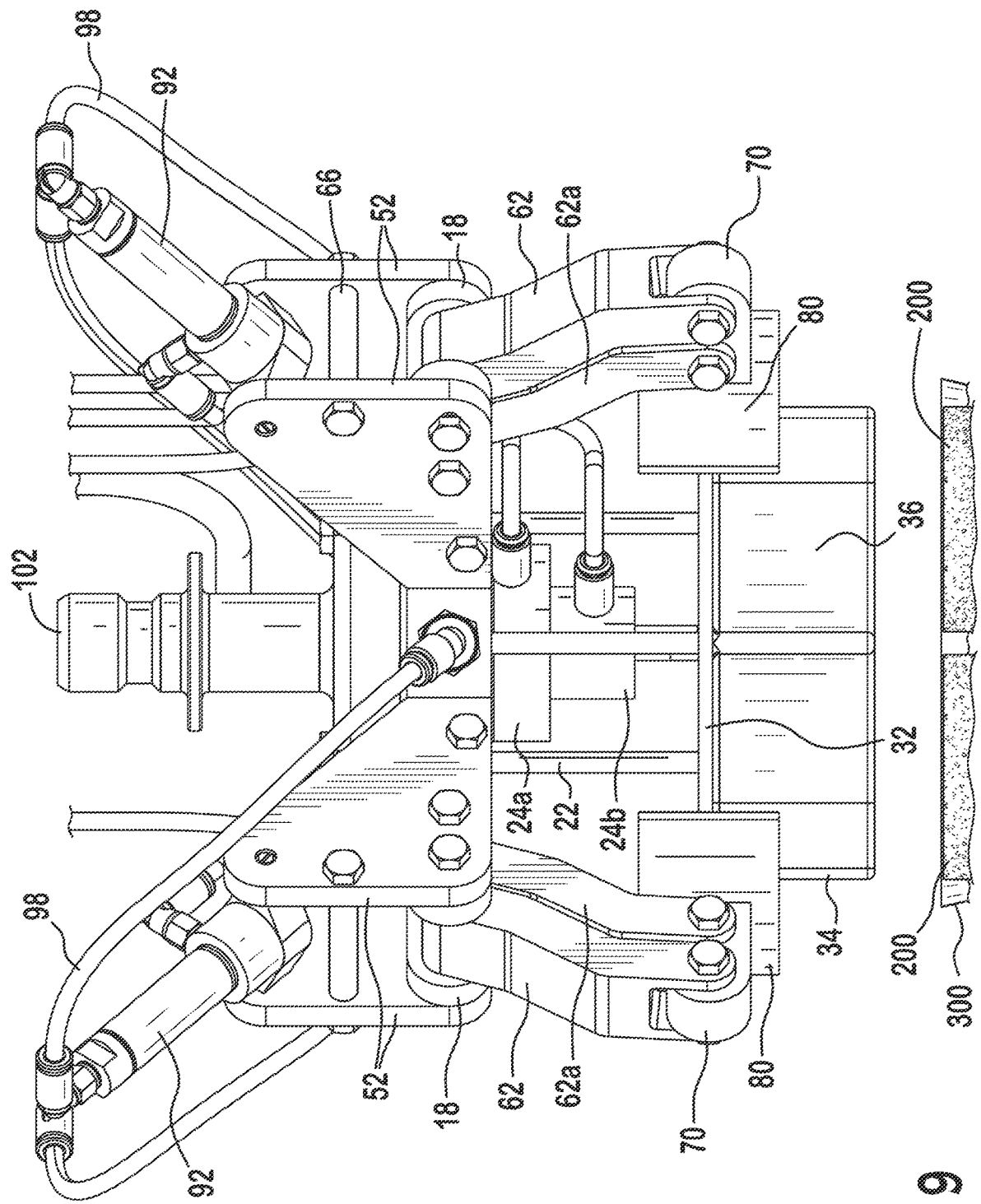
FIG. 9 is a front perspective view of FIG. 8.
Figure 10:
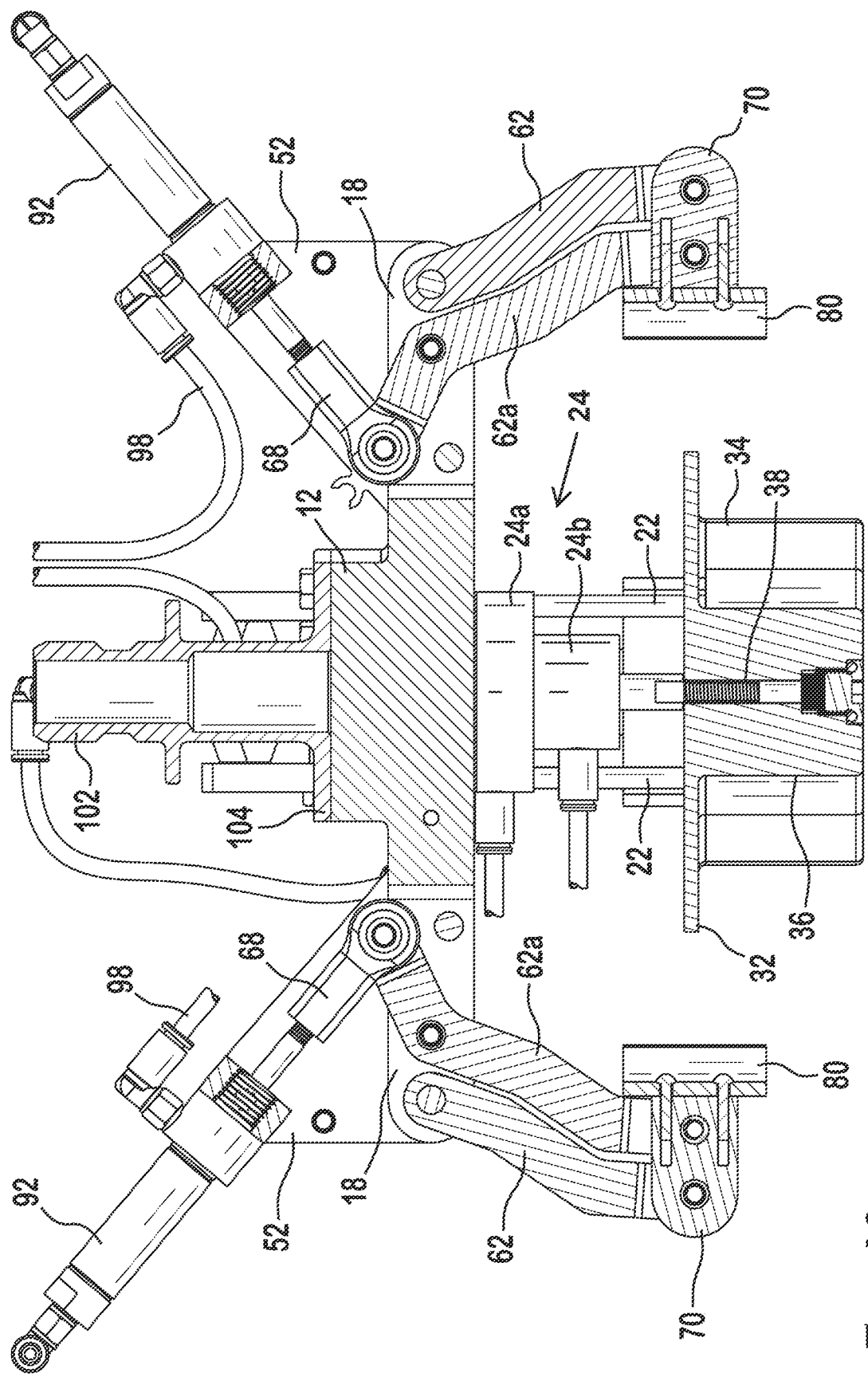
FIG. 10 is a cross sectional view of FIG. 9.
Figure 11:
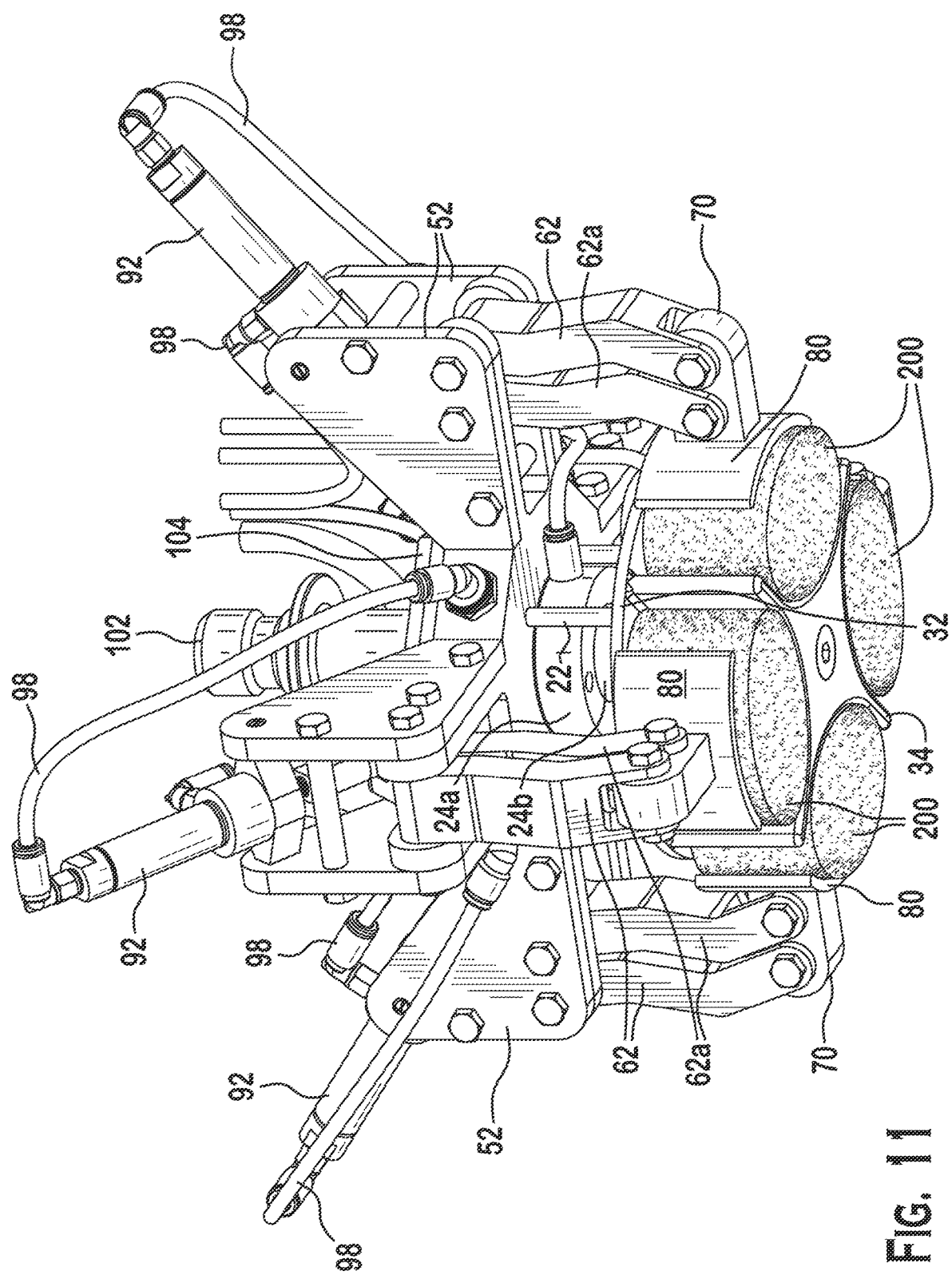
FIG. 11 is a front, bottom, right side perspective view of the sandwich packaging system according to the invention.
Figure 12:
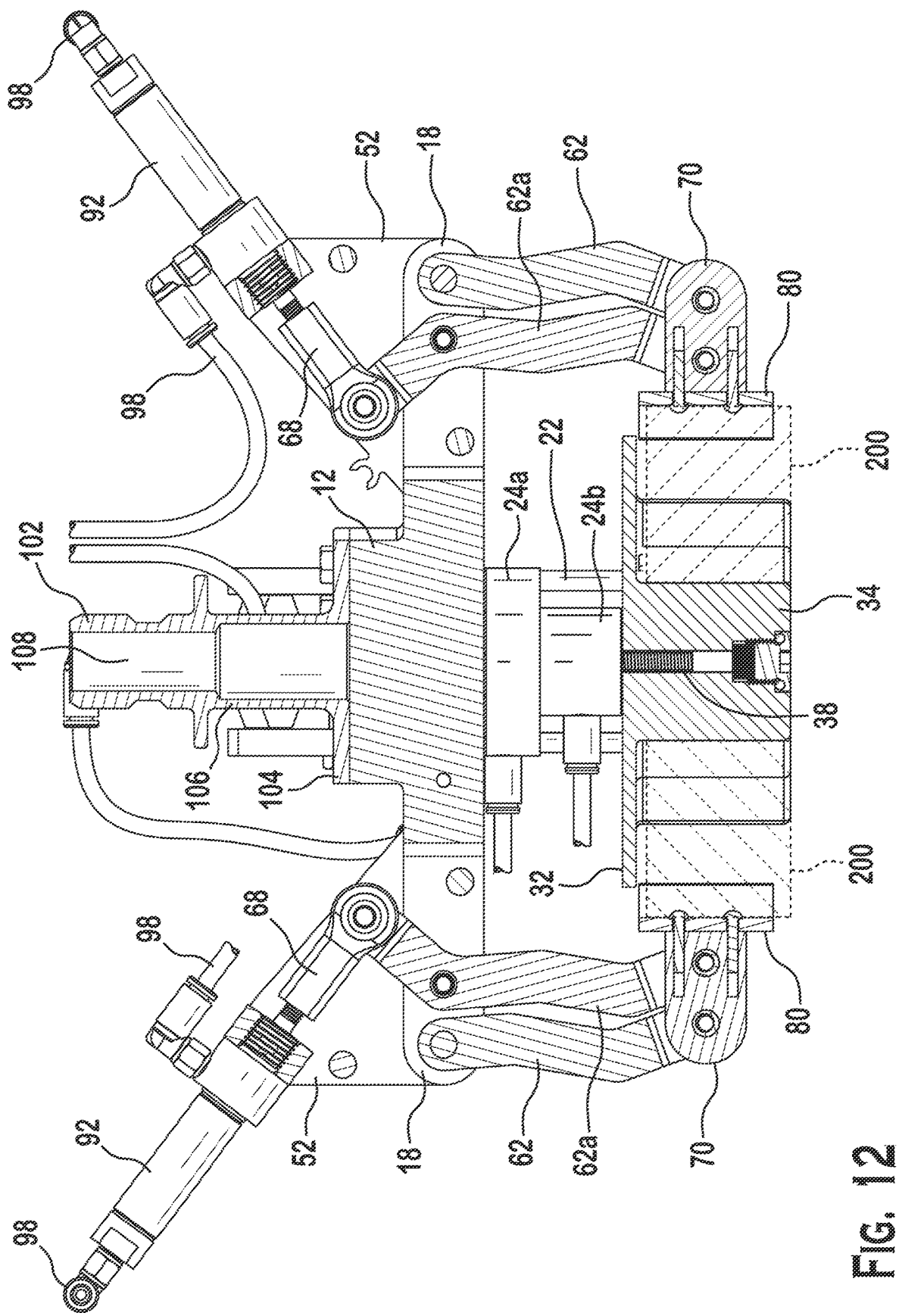
FIG. 12 is a cross sectional view of FIG. 11.

As assembled and illustrated in FIGS. 1-13, the receiving base 32 is coupled to the main body 12 by the inner frame coupler 24b, 24a. The plurality of supports 22 are positioned between the main body 12 and receiving base 32 for additional support as illustrated in FIG. 6. The plurality of connection legs 18 are positioned between the plate like members 52 of the claw frame assembly 50 as shown in FIG. 6. The plurality of connection legs 18 are coupled to the claw frame assembly 50 by the plurality of fastener passageways 20, 54 of the connection legs 18 and the plate like members 52. The pair of movement members 62 are positioned between both the connection legs 18 and the plate like members 52. The pair of movement members 62 are fastened to the connection legs 18 and the plate like members 52 of the claw frame assembly 50 by the plurality of fastener passageways 20, 54.

The cradle coupler 70 is positioned between each handler claw 42, the cradle 80 is positioned on an inner edge of the first movement member 62a. The cradle 80 is fastened to the inner edge of the first movement member 62a by the pair of mounting passageways 82.

Figure 14:
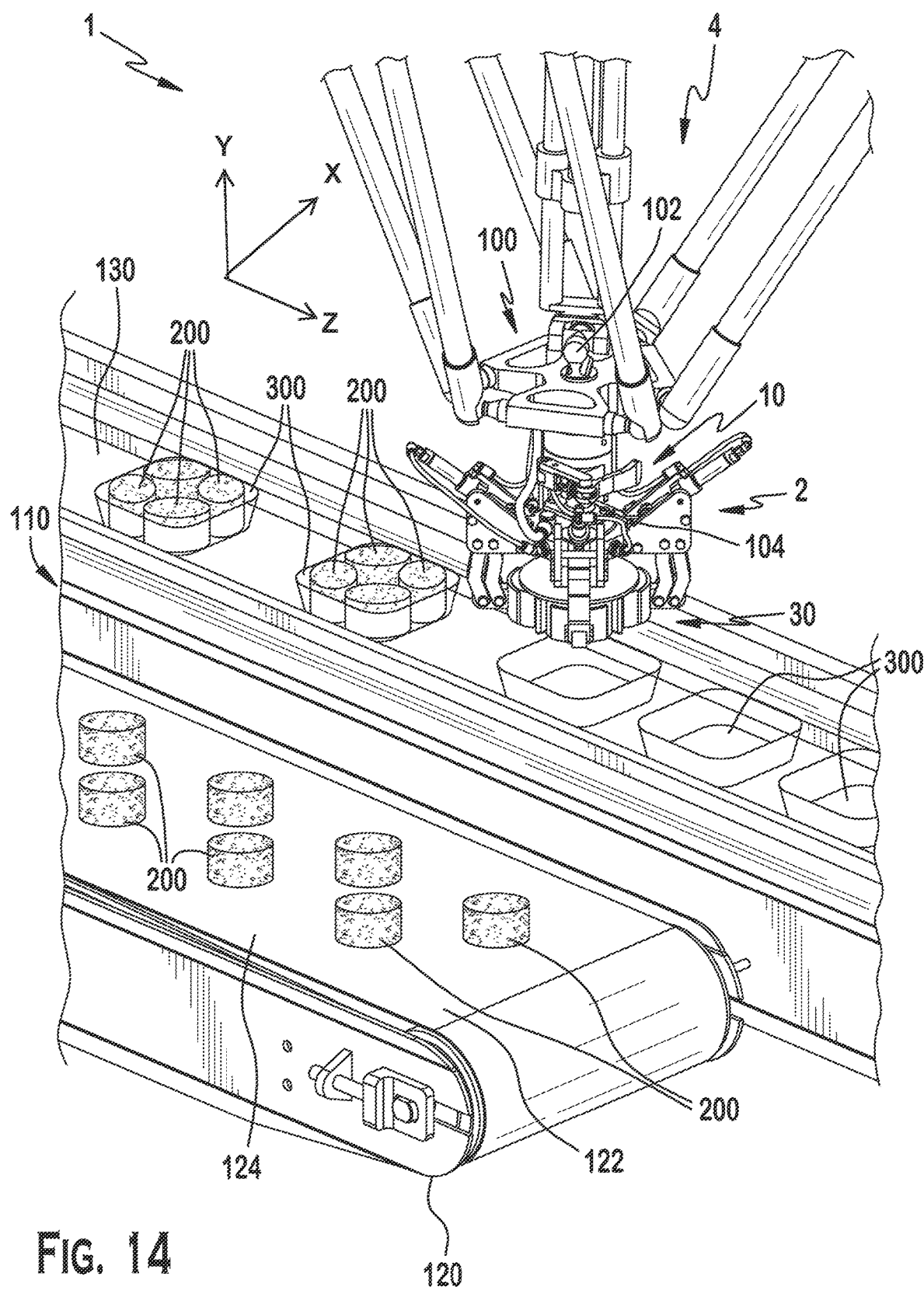
FIG. 14 is a perspective view of the sandwich packaging system according to the invention in operation.
Figure 15:
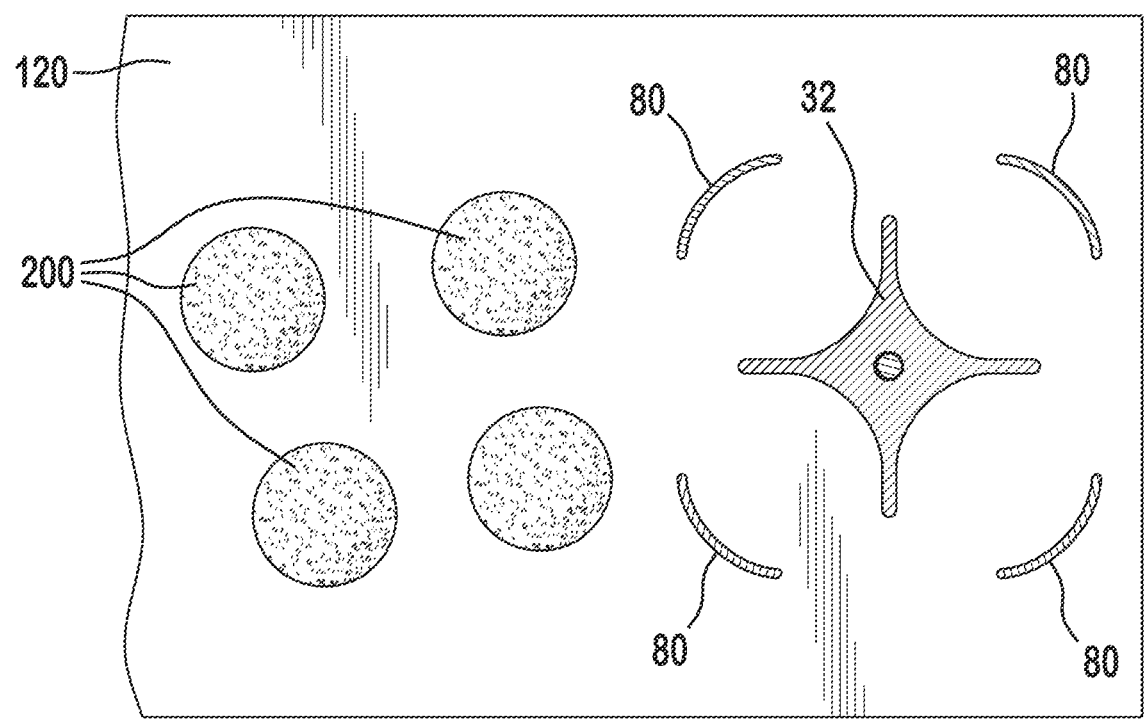
FIG. 15 is a top schematic view of the sandwich packaging system according to the invention.
Figure 16:
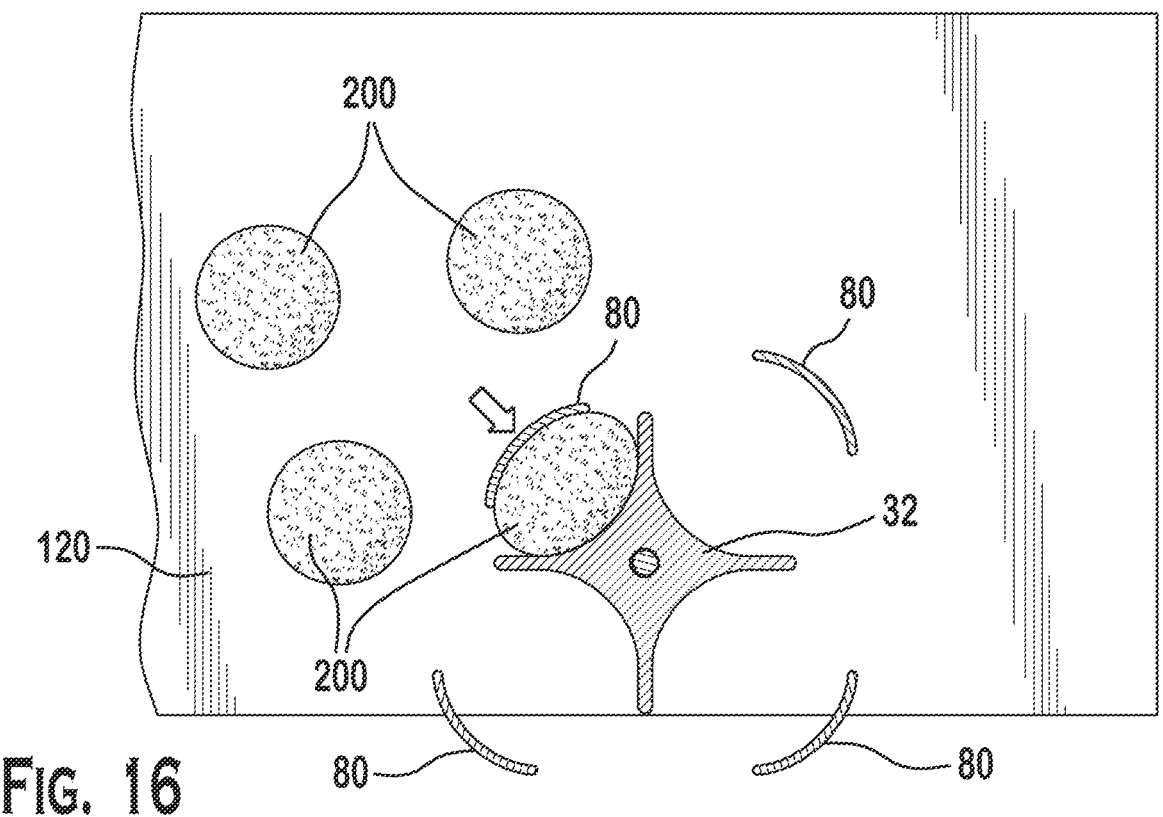
FIG. 16 is another top schematic view of the sandwich packaging system according to the invention.
Figure 17:
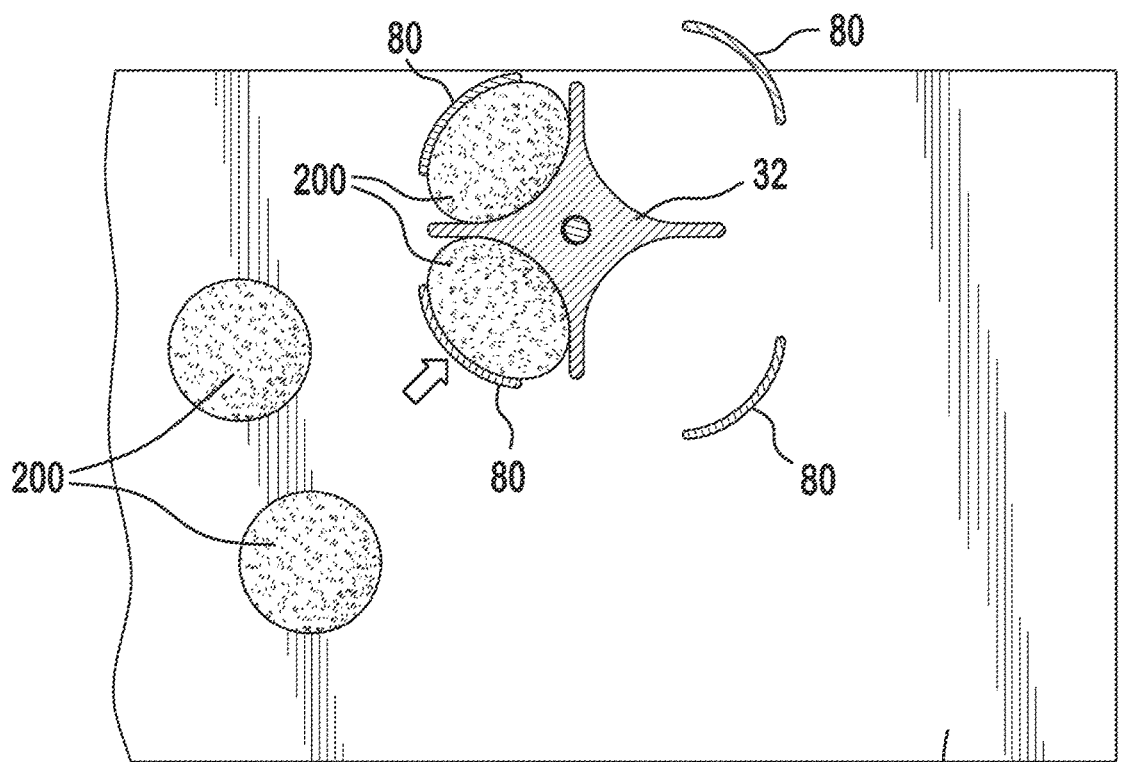
FIG. 17 is another top schematic view of the sandwich packaging system according to the invention.

The directional assembly 4 includes a robotic arm assembly 100 which can be coupled to and controllably move the handler tool assembly 2, for example, at least within a working range of the robotic arm assembly 100, as depicted in FIG. 14. In an embodiment, the robotic arm assembly 100 is capable of moving independently, or in combination, along axes X, Y, Z, thereby allowing for horizontal and vertical movements and placement of the handler tool within at least the range shown in FIG. 14.

In the exemplary embodiment, the robotic arm assembly 100 generally includes a robotic arm 102. The robotic arm 102 may be any suitable unit known to those skilled in the art, such as gantry robots, articulated robots, linear robots, cylindrical robots, SCARA robots, multi-axis robots, or delta robots (as depicted in FIG. 14). As shown in FIG. 14, the robotic arm 102 may be a commercially available stainless steel (IP69K rated) delta robot of the type sold by JLS Automation. In an embodiment, the robotic arm assembly 100 may be positioned above the handler tool assembly 2. The robotic arm 102 utilizes a controller (not shown) which directs the actions of the robotic arm 102 according to programmed instructions, as will be familiar to those of skill in the art.

In the depicted embodiment, the robotic arm 102 is provided with an end of arm tooling component in the form of the handler tool assembly 2, which is secured to the robotic arm 102 at a robotic coupler 104 that is reversibly received by the robotic arm 102. The robotic arm 102 thereby allows for controlled movement of the handler tool assembly 2 in multiple axes according to program instructions from the computer software controlling the robotic arm 102.

As illustrated in FIG. 14, the handler tool assembly 2 attaches to the robotic arm assembly 100 via the robotic arm 102 attaching to the robotic coupler 104 positioned above the main body 12, which may be any suitable method of securing the tool to the robotic arm 102, such that the handler tool assembly 2 can be moved, rotated and positioned accurately by the movements of the robotic arm 102.

As illustrated, the robotic coupler 104 may feature a flanged tool stem 106 that can securely receive a corresponding receiver 108 of the robotic arm 102.

Figure 13:
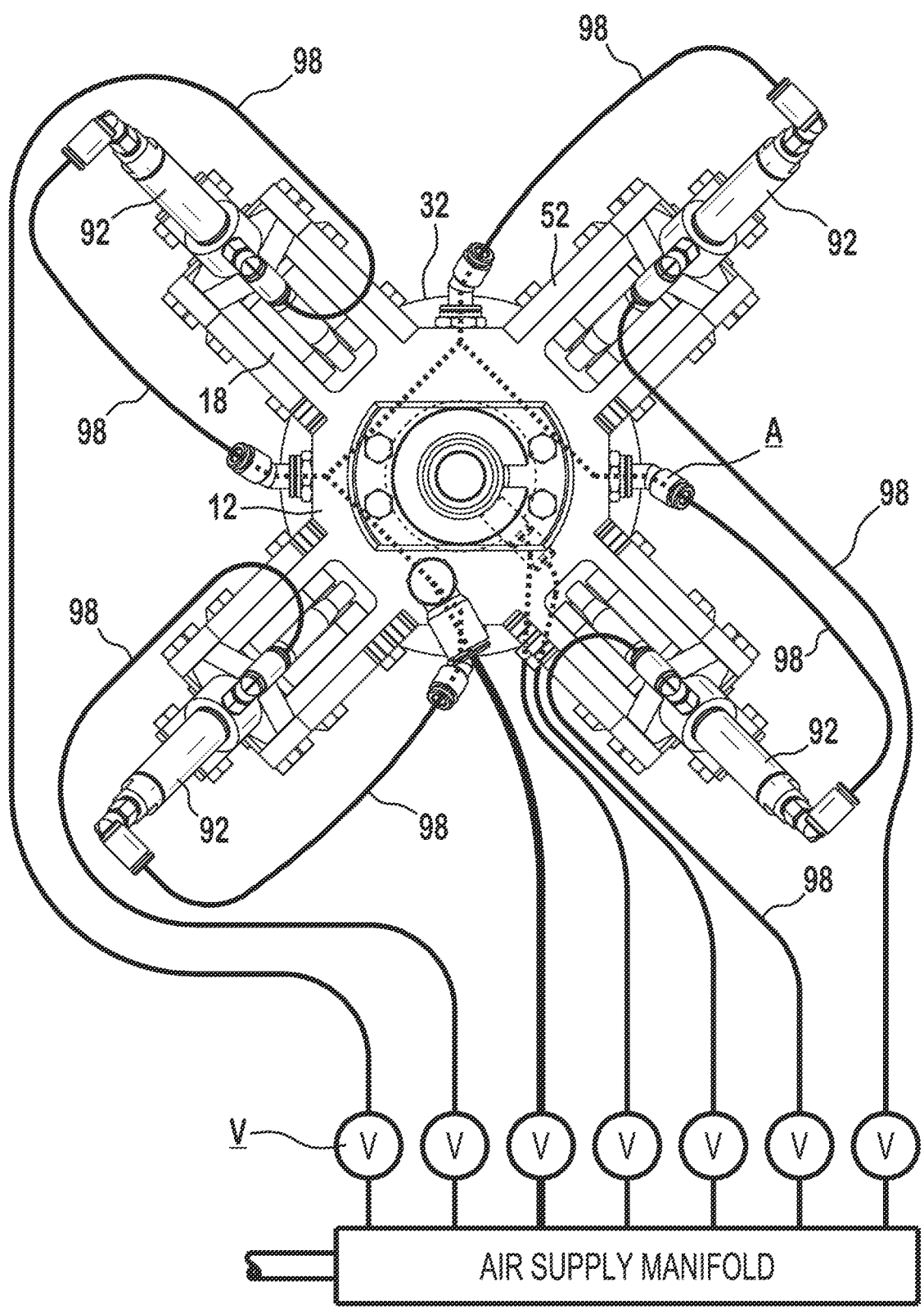
FIG. 13 is a top view of the sandwich packaging system according to the invention.

As illustrated in FIG. 13, a plurality of pneumatic valves V are coupled to the actuator lines 98.

Operation of the sandwich packaging system 1 as illustrated in FIGS. 1-18, will now be described. In one embodiment, the conveyor system 110 is shown having a first conveyor assembly 120, and a second conveyor assembly 130.

The first conveyor assembly 120 includes a conveyor belt 122. The conveyor belt 122 is a standard conveyor belt, one skilled in the art would understand the claimed invention. The first conveyor assembly 120 further includes a top surface 124 positioned on the conveyor belt 122. The top surface 124 of the conveyor belt 122 is configured to move in the longitudinal z-direction, as shown in a direction from left to right. The first conveyor assembly 120 is shown conveying a plurality of product 200.

In the depicted embodiments, and as can be seen in detail with reference to FIGS. 14-20, the product 200 is individually cut pinwheels. The product 200 is positioned on the first conveyor assembly 120 after the product 200 is cut.

As the product 200 moves along the conveyor belt 122, the absolute position of the product 200 is monitored at all times by the controller for the robotic arm 102, for example by using sensors and/or software as known to those of skill in the art. As the product 200 advances along the length of the first conveyor assembly 120, it will approach a predefined point on the first conveyor assembly 120, within the working range of the robotic arm 102, designated the pick up point, where the handler tool assembly 2 will be deployed to pick up the product 200.

Prior to the product 200 reaching the pick up point, the robotic arm 102 with the handler tool assembly 2 securely coupled thereto may be directed to rest at a preliminary position. The preliminary position may be generally near the conveyor system 110, and at a safe travel height (in the vertical Y direction) that allows lateral movement of the robotic arm 102 in a manner that will ensure the lowest point of the handler tool assembly 2 will be clear of the height of any of the product 200 on the conveyor belt 122, or any equipment obstructions within the working range of the robotic arm 102. Typically, the safe travel height is one that has the lowest point of the handler tool assembly 2 at least 3 inches above the top surface 124 of the conveyor belt 122.

As illustrated in FIGS. 14-19, the handler tool assembly 2 drops in the vertical Y direction and clamps the product 200 between the article receivers 36 of the receiving base 32 and the cradle 80.

As further illustrated in FIGS. 15-19, each handler claw 42, will individually engage to clamp the product 200 until all of the handler claws 42 are engaged and holding the product 200. In an alternate embodiment, each of the handler claws 42 will engage simultaneously and clamp on the product 200.

While the above described method of picking up the product 200 is described, one skilled in the art will recognize that adjustments to the methods that may be required for such an instance, and thus the robotic arm 102 may be programmed to position the handler tool assembly 2 in the vicinity of such product 200, adjusting the position, orientation, and movements of the handler tool assembly 2 relative to the product 200 as it is conveyed along the first conveyor assembly 120.

Figure 18:
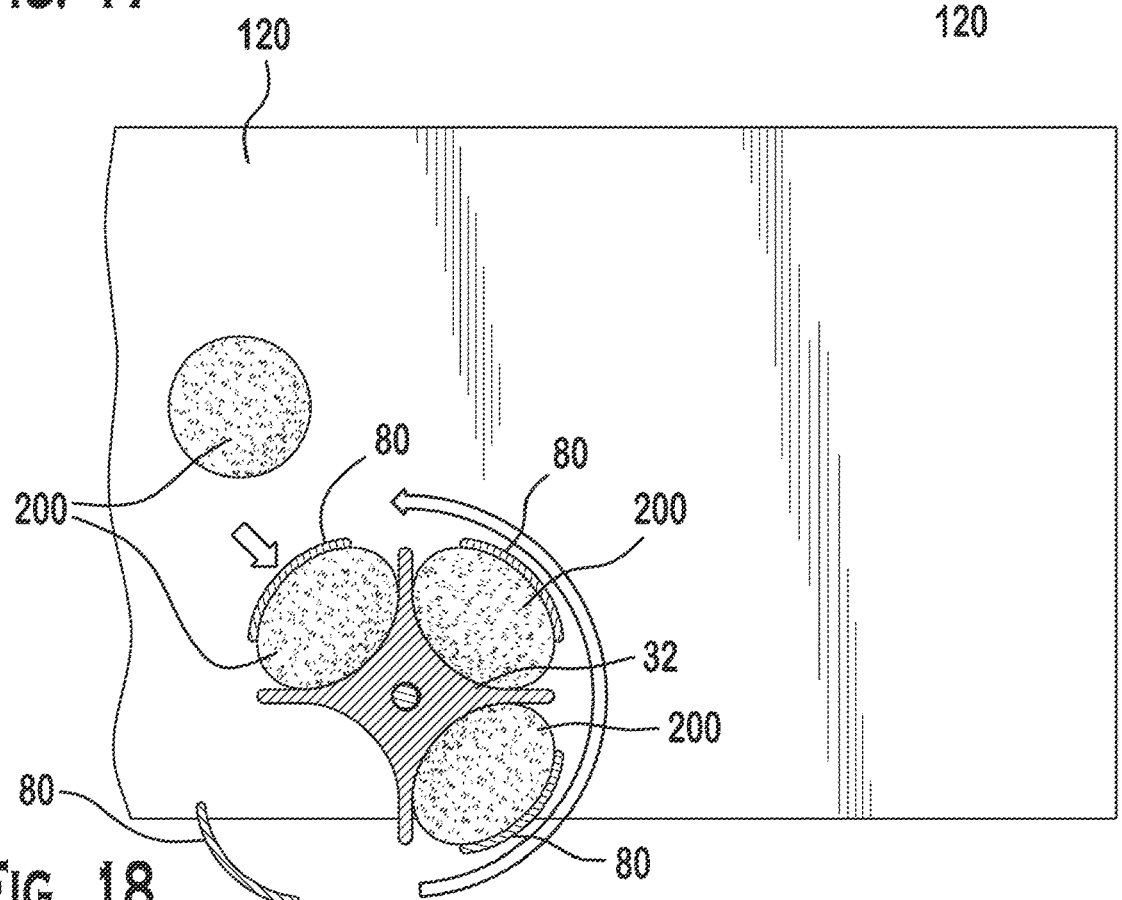
FIG. 18 is another top schematic view of the sandwich packaging system according to the invention.

The handler tool assembly 2 necessarily rotates synchronously with the robotic arm 102, due to the secured connection at the robotic coupler 104 and the flanged tool stem 106, with the rotation represented by the direction of a movement arrow as illustrated in FIG. 18.

To maximize efficiency of movement, the rotation of the robotic arm 102, if required, may be programmed to occur during lateral movement, though it is contemplated that the rotation of the robotic arm 102 may alternatively be performed before, or after, the lateral movement of the robotic arm 102 between conveyor assemblies 120, 130. In this manner, the orientation of the product 200 may be reversed as needed, while the robotic arm 102 is moved laterally in the plane created by the axes Z and X, moving between the first 120 and second conveyor assemblies 130 to position the handler tool assembly 2 above the second conveyor assembly 130, such that the product 200 may be placed onto the second conveyor assembly 130.

Figure 19:
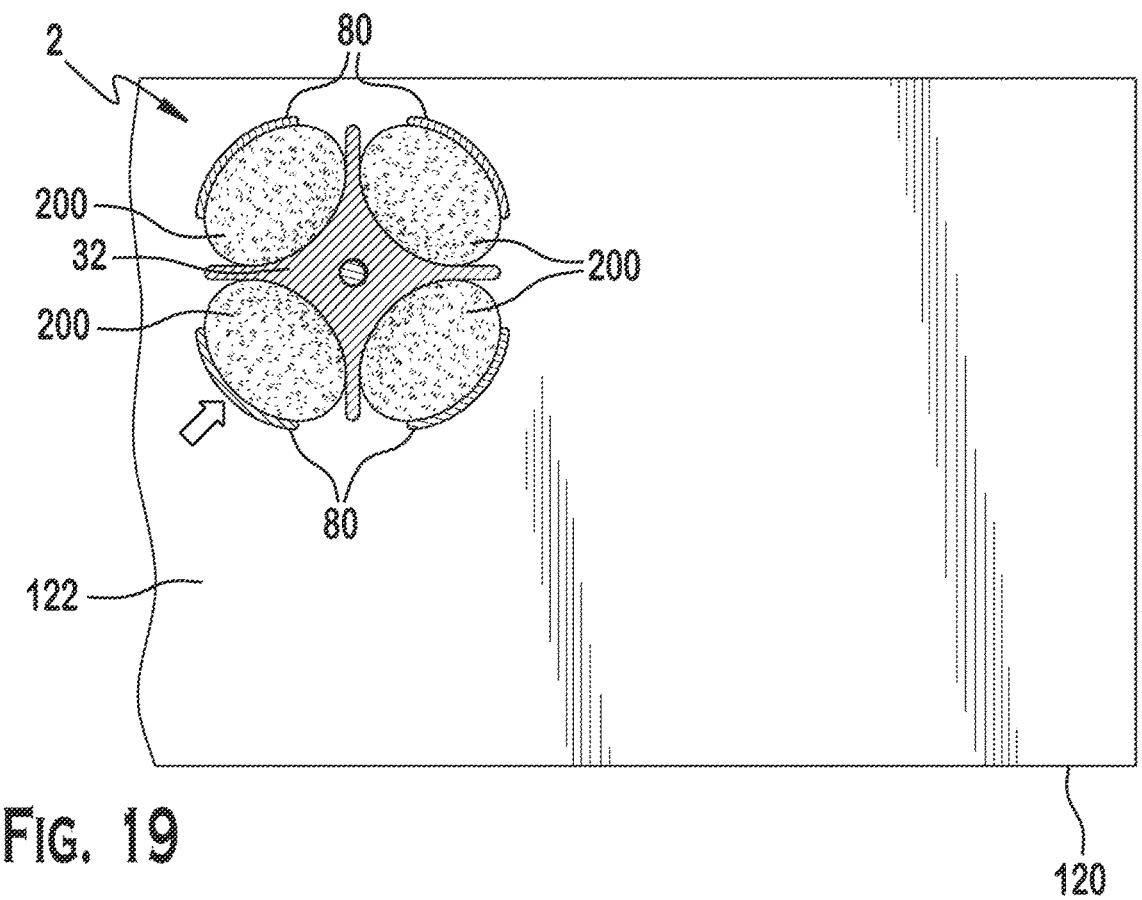
FIG. 19 is another top schematic view of the sandwich packaging system according to the invention.
Figure 20:
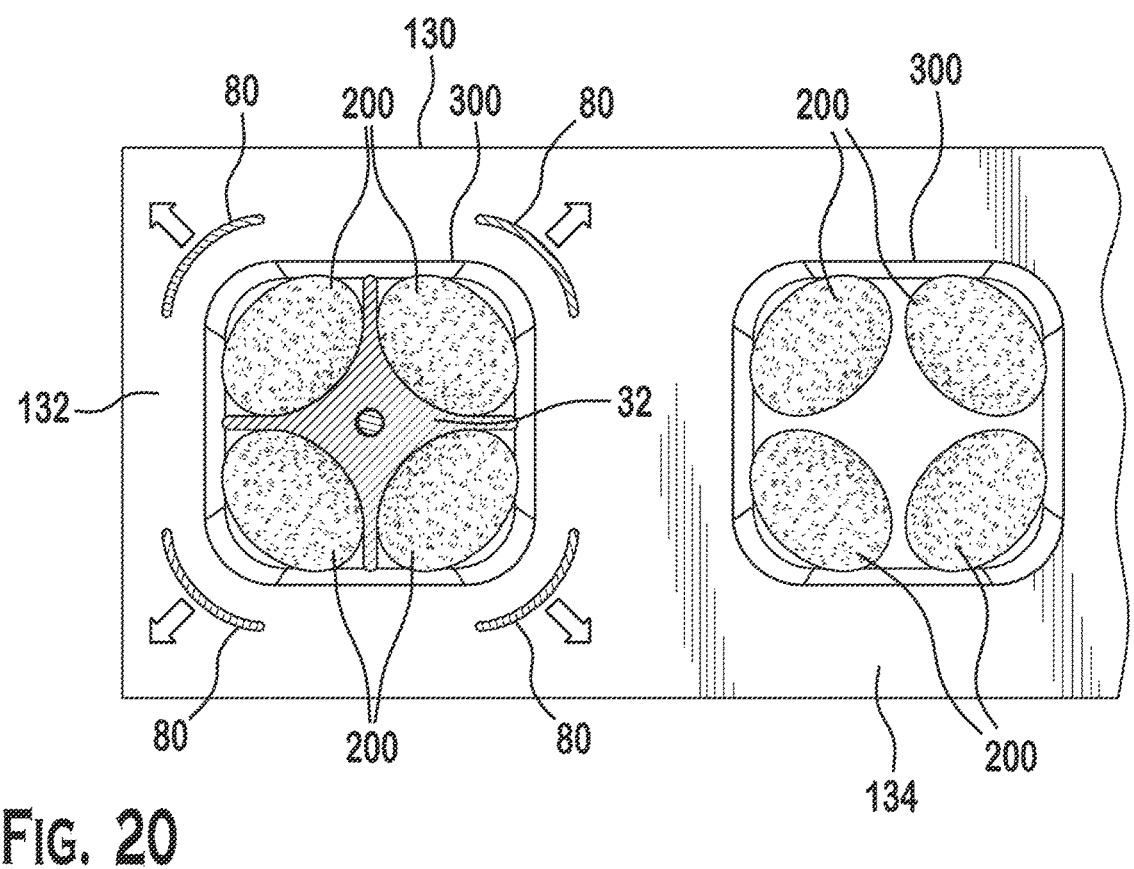
FIG. 20 is another top schematic view of the sandwich packaging system according to the invention.

As illustrated in FIGS. 19-20, the second conveyor assembly 130 includes a conveyor belt 132. The conveyor belt 132 is a standard conveyor belt, one skilled in the art would understand the applicant's design is not the exclusive embodiment. The second conveyor assembly 130 further includes a top surface 134 positioned on the conveyor belt 132.

As illustrated in FIGS. 19-20, the handler tool assembly 2 swings and is positioned above the second conveyor assembly 130, for placing of the product 200 thereupon in a container 300 positioned on the top surface 134 of the conveyor belt 132. The optional rotation of the handler tool assembly 2 to adjust the orientation of the product 200 is only necessary where the orientation of the product 200 is to be changed between the first conveyor assembly 120 and second conveyor assembly 130, or to accommodate the relative alignment of the first conveyor assembly 120 and second conveyor assembly 130, which adjustments will be understood by those skilled in the art.

The foregoing illustrates some of the possibilities for practicing the invention. Many other embodiments and fields of use for the assembly are possible and within the scope and spirit of the invention. It is, therefore, intended that the foregoing description be regarded as illustrative rather than limiting.

What is claimed is:

1. A sandwich packaging system comprising:
   a handler tool assembly having:
      a support assembly having:
         a main body including a plurality of connection legs; and
         an inner frame coupler; and
      a receiving assembly having:
         a receiving base;
         a formulated wall positioned below the receiving base including a plurality of article receivers; and
      a claw assembly having:
         a plurality of handler claws; and
      a directional assembly having a robotic arm assembly coupled to the support assembly by a robotic coupler, the handler tool assembly, drops in a vertical direction and clamps a product by the plurality of handler claws.

2. The sandwich packaging system of claim 1, wherein the formulated wall is X-shaped.

3. The sandwich packaging system of claim 2, wherein each of the plurality of handler claws include a claw frame.

4. The sandwich packaging system of claim 3, wherein each of the plurality of handler claws further include a claw arm.

5. The sandwich packaging system of claim 4, wherein each of the plurality of handler claws further include a cradle.

6. The sandwich packaging system of claim 5, wherein the plurality of connection legs are positioned between the claw frame.

7. The sandwich packaging system of claim 6, wherein the claw arm is positioned between both the plurality of connection legs and the claw frame.

8. The sandwich packaging system of claim 7, wherein the product reaches a designated pick up point where the handler tool assembly will be deployed.

9. A sandwich packaging system comprising:
   a handler tool assembly having:
      a support assembly having:
         a main body including a plurality of connection legs; and
      a receiving assembly having:
         a receiving base;
         a formulated wall positioned below the receiving base including a plurality of article receivers; and
      a claw assembly having:
         a claw frame;
         a claw arm coupled to a claw frame;
         a cradle; and a claw actuator assembly positioned above the claw frame; and a directional assembly having a robotic arm assembly coupled to the support assembly, the handler tool assembly, drops in a vertical direction and clamps a product between the plurality of article receivers and the cradle.

10. The sandwich packaging system of claim 9, wherein the main body further includes a plurality of actuator receivers positioned on a plurality of side walls of the main body.

11. The sandwich packaging system of claim 10, wherein the plurality of article receivers are positioned on an inner side wall of the formulated wall.

12. The sandwich packaging system of claim 11, wherein the receiving base is positioned below the main body and coupled to the main body.

13. The sandwich packaging system of claim 12, wherein the plurality of connection legs are positioned between the claw frame.

14. The sandwich packaging system of claim 13, wherein the robotic arm assembly is capable of moving independently, along axes X, Y, Z, thereby allowing for horizontal and vertical movements and placement of the handler tool assembly.

15. The sandwich packaging system of claim 14, wherein the robotic arm assembly is capable of moving in combination, along axes X, Y, Z, thereby allowing for horizontal and vertical movements and placement of the handler tool assembly.

16. The sandwich packaging system of claim 15, wherein the robotic arm assembly includes a robotic arm.

17. The sandwich packaging system of claim 16, wherein the support assembly attaches to the robotic arm assembly by the robotic arm attaching to a robotic coupler.

18. The sandwich packaging system of claim 17, wherein the robotic coupler includes a flanged tool stem securely receives a corresponding receiver of the robotic arm assembly.

* * * * *